United States Patent
Long et al.

(10) Patent No.: US 8,089,934 B2
(45) Date of Patent: Jan. 3, 2012

(54) METHOD AND SYSTEM FOR CONTROLLING A CALL HANDOVER BETWEEN TELECOMMUNICATION NETWORKS

(75) Inventors: Shulping Long, Shenzhen (CN); Jie Xu, Shenzhen (CN); Yi Zhang, Shenzhen (CN); Fang You, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1146 days.

(21) Appl. No.: 11/896,569

(22) Filed: Sep. 4, 2007

(65) Prior Publication Data

US 2008/0057962 A1     Mar. 6, 2008

(30) Foreign Application Priority Data

Sep. 5, 2006   (CN) .......................... 2006 1 0127153

(51) Int. Cl.
   *H04Q 7/00*    (2006.01)
(52) U.S. Cl. .......................... 370/331; 370/338; 370/328
(58) Field of Classification Search .................. 370/338, 370/328, 466, 331; 455/436, 558
   See application file for complete search history.

(56) References Cited

U.S. PATENT DOCUMENTS

| | | | |
|---|---|---|---|
| 4,942,601 A * | 7/1990 | Park ......................... | 379/208.01 |
| 5,903,840 A * | 5/1999 | Bertacchi ...................... | 455/436 |
| 2002/0119776 A1 * | 8/2002 | Vestergaard et al. ......... | 455/436 |
| 2004/0264410 A1 | 12/2004 | Sagi et al. | |
| 2005/0036462 A1 * | 2/2005 | Sillasto et al. ................ | 370/331 |
| 2005/0047435 A1 * | 3/2005 | Segal et al. .................... | 370/466 |
| 2005/0070288 A1 * | 3/2005 | Belkin et al. .................. | 455/439 |
| 2006/0034266 A1 * | 2/2006 | Harris et al. .................. | 370/356 |
| 2006/0293053 A1 * | 12/2006 | Zanaty .......................... | 455/436 |
| 2010/0034166 A1 * | 2/2010 | Olvera-Hernandez ........ | 370/331 |

FOREIGN PATENT DOCUMENTS

| | | |
|---|---|---|
| CN | 1620182 A | 5/2005 |
| CN | 1679274 A | 10/2005 |
| WO | WO2005/025108 A2 | 3/2005 |
| WO | WO-2005/025108 A2 | 3/2005 |
| WO | WO-2006/066447 A1 | 6/2006 |

OTHER PUBLICATIONS

U.S. Appl. No. 60/720,270, filed Sep. 23, 2005.*
Extended European Search Report including Supplementary European Search Report and Written Opinion issued in EP Application No. 07764241.1 on Dec. 30, 2009.
3GPP: "$3^{rd}$ Generation Partnership Project; Technical Specification Group Services and System Aspects; Voice Call Continuity between CS and IMS; Stage 2 (Release 7)," [online] Jul. 31, 2006, www.3gpp.org/ftp/Specs/ html-info/23206.htm.

(Continued)

*Primary Examiner* — Chuong T Ho
(74) *Attorney, Agent, or Firm* — Finnegan, Henderson, Farabow, Garrett & Dunner LLP

(57) ABSTRACT

A method for controlling a call handover between telecommunication networks includes determining whether a User Equipment (UE), in communication with a first network, is engaged in a call attempt when the UE is to be transferred from the first network to a second network, if the UE is engaged in a call attempt, maintaining the UE communicating with the first network, and if the UE is not engaged in a call attempt, initiating the handover from the first network to the second network.

20 Claims, 4 Drawing Sheets

OTHER PUBLICATIONS

International Search Report from the Chinese Patent Office for International Application No. PCT/CN2007/070314.

Written Opinion of the International Searching Authority (translation) dated (mailed) Nov. 1, 2007, issued in related Application No. PCT/CN2007/070314, filed Jul. 18, 2007, Huawei Technologies Co., Ltd.

3GPP TS 23.206 $3^{rd}$ Generation Partnership Project, "Technical Specification Group Services and System Aspects; Voice Call Continuity between CS and IMS; Stage 2," Jul. 2006.

Extended European Search Report dated (mailed) Dec. 30, 2009, issued in related Application No. 07764241.1-2415, PCT/CN2007070314, Hauwei Technologies Co., Ltd.

* cited by examiner

METHOD AND SYSTEM FOR CONTROLLING A CALL HANDOVER BETWEEN TELECOMMUNICATION NETWORKS

This application claims the benefit of CN Application No. 200610127153.8, filed on Sep. 5, 2006, titled "METHOD, COMMUNICATION SYSTEM AND USER EQUIPMENT FOR CONTROLLING A CALL HANDOVER", which is incorporated herein by reference in its entirety.

FIELD OF THE INVENTION

The present invention relates to wireless communication technology, and more particularly to a method and system for controlling handover when a user equipment (UE) is to be transferred between two different telecommunication networks.

BACKGROUND OF THE INVENTION

Voice communication is evolving from circuit-switched (CS) technology, such as provided by the Global System for Mobile communications (GSM), to packet-switched technology, such as provided by Voice over Internet Protocol (VoIP) techniques across Internet Protocol (IP) Networks. While voice telecommunication is evolving, wireless networks are evolving from circuit switched voice networks (e.g., GSM and Interim Standards 95 (IS-95)) to packet switched networks (e.g., Wireless Local Area Network (WLAN), Universal Mobile Telecommunications System (UMTS), Code Division Multiple Access 2000 (cdma2000)), which are capable of supporting multimedia applications to mobile users over IP. Third Generation Partnership Project (3GPP) has specified the IMS in UMTS to accomplish the control and service functions of wireless IP multimedia. In this regard, 3GPP has adopted Session Initiation Protocol (SIP) as the signaling protocol in an IP multimedia subsystem (IMS). At the same time, in cdma2000, Third Generation Partnership Project 2 (3GPP2) has been developing the IMS, formerly referred to as the IP Multimedia Domain (MMD), to implement the control and service functions of wireless IP multimedia. 3GPP2 has also adopted SIP for use in the IMS specification. IMS was introduced, first, to handle traditional voice services over IP, second, to handle all multimedia services provided to subscribers. A UE can communicate with an IMS via a WLAN and gain access to IMS services, such as VoIP. The network, which provides a communication between a UE and an IMS, is referred to as an IMS domain in this specification. The network, in which voice communication is implemented with CS technology, is referred to as CS domain in this specification.

The current 3GPP Release 7 supports Voice Call Continuity (VCC) which makes it possible to hand over a call when a UE is to be transferred from an IMS domain to a CS domain or from a CS domain to an IMS domain. The UE provides integrated control over different radio access so that all the calls can be handled using appropriate radio access. The current 3GPP specification provides for a voice call continuity application server (VCC AS) that serves as an anchor point for a voice call (i.e., it is the node from which a handover is initiated) and controls and handles voice calls to and from the UE, regardless of whether of the same or different networks.

VCC provides for handing over a call between networks without voice disruption when a call is on-going (i.e., during call communication). Unfortunately, a handover during a period of ringing tone (the UE is a called terminal) or ring-back tone (the UE is a calling terminal) is not provided by the current 3GPP. A called UE will initiate a calling flow when the called UE is handed over from a CS domain to an IMS domain or from an IMS domain to a CS domain. Therefore, an Answer message to indicate that the phone is picked up by the user can't be transferred by the called UE. Because the Answer message can't be received by the calling UE, the call can't be accomplished. When a calling UE initiates a call in CS domain, a ring-back tone is provided by a Media Gateway (MGW) which is responsible for switching the traffic between the CS and IMS domain and for converting the voice call stream to a suitable form so that the voice call transfer between the CS and IMS domain is possible. The MGW is detached from the voice call path when the calling UE is handed over from the CS domain to the IMS domain. Therefore, if a handover is initiated during a call attempt (a period of call negotiation, ringing, or ring-back tone), the ring-back tone will not be received by the calling UE (the MGW is detached).

What is needed, therefore, is a method and system for controlling a handover during a call attempt (a period of ringing and ring-back tone) when the UE is to be transferred between a CS domain and an IMS domain.

SUMMARY OF THE INVENTION

A method for controlling a call handover between telecommunication networks includes determining whether a User Equipment (UE), in communication with a first network, is engaged in a call attempt when the UE is to be transferred from the first network to a second network, if the UE is engaged in a call attempt, maintaining the UE communicating with the first network, and if the UE is not engaged in a call attempt, initiating the handover from the first network to the second network.

According to the method above-mentioned, a handover happening during a call attempt (a period of call negotiation, ringing, or ring-back tone) is forbidden, which resolves the problem of current art.

Other objects, advantages and novel features will become more apparent from the following detailed description of preferred embodiments when taken in conjunction with the accompanying drawings, in which:

DETAILED DESCRIPTION OF THE EMBODIMENTS

In the following description of various embodiments of the present invention, reference is made to the accompanying drawings, which show, by way of illustration various embodiments in which the invention may be practiced. It is to be understood that other embodiments may be utilized and structural and functional modifications may be made without departing from the scope and spirit of the present invention.

Figure 1:
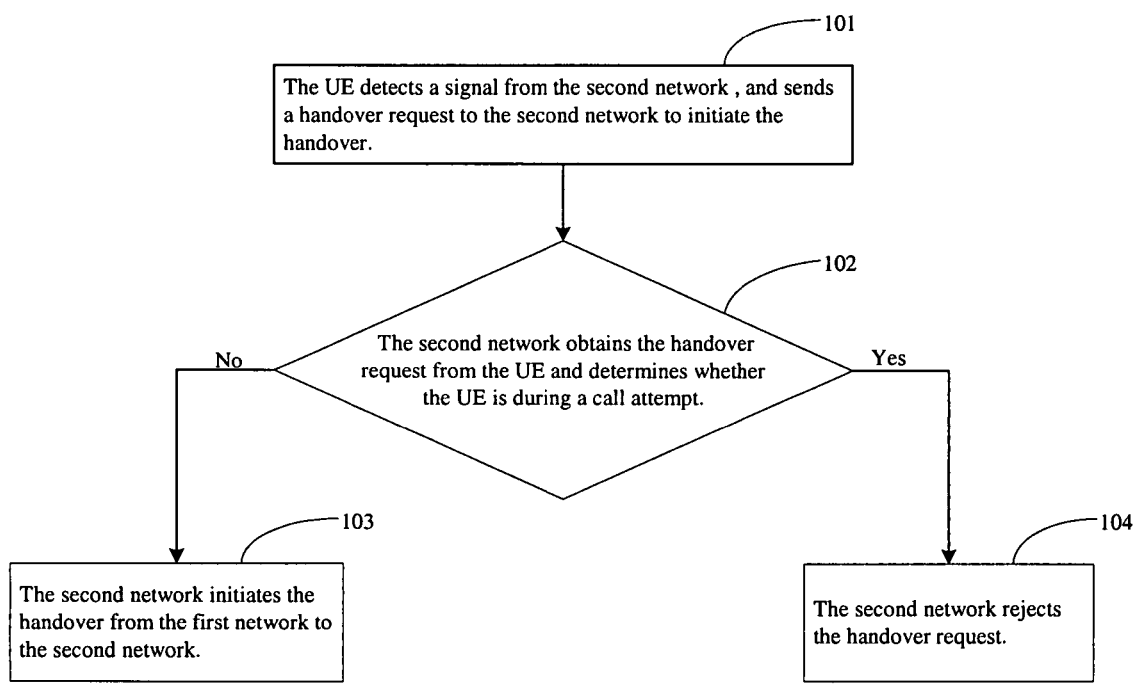
FIG. 1 shows an embodiment of a method for controlling handover performed by a network.

FIG. 1 shows an embodiment of a method for controlling handover performed by a network when a UE is to be transferred from a first network to a second network. For example, the first network may be a CS domain, and the second network may be an IMS domain. In alternative, the first network may be an IMS domain, and the second network may be a CS domain.

In block 101, the UE detects a signal from the second network when the UE is to be transferred from the first network into an area which is covered by both the first network and the second network. The UE sends a handover request to the second network to initiate the handover from the first network to the second network. In an alternative embodiment, the UE sends the handover request voluntarily without detecting the changing of signals. The UE may be engaged in an on-going call, may be in a standby mode, or may be during a call attempt (a period of call negotiation, ringing, or ring-back tone), when the UE is to be transferred from the first network to the second network.

In block 102, the second network obtains the handover request from the UE and determines whether the UE is during a call attempt (a period of call negotiation, ringing, or ring-back tone).

In block 103, in response to determining that the UE is not during a call attempt, the second network initiates the handover from the first network to the second network. If the UE is not during a call attempt, the UE may be engaged in an on-going call. The on-going call may be handed over to the second network according to VCC. The UE continues the on-going call in the second network. If the UE is in the standby mode, the network hands over the UE connection from the first network to the second network. The UE can now accomplish communication in the second network.

In block 104, in response to determining that the UE is during a call attempt (a period of ringing or ring-back), the second network rejects the handover request. The UE maintains the connection with the first network. In an embodiment, after a connection between the UE and a calling terminal or a called terminal is established, the second network initiates the handover from the first network to the second network. The UE continues the call in the second network. In an alternative embodiment, in response to determining that the UE is during a call attempt (a period of call negotiation, ringing, or ring-back tone), the second network saves the handover request and returns a Pending message to the UE. A Pending message is used to communicate to the UE that the handover request is waiting to be processed or is being processed. The Pending message may be a SIP response message, such as "182 Queued" message, or "183 Session Progress" message. After determining that the UE is not during a call attempt, the second network performs the saved handover request and initiates the handover from the first network to the second network.

In one embodiment of the present invention, after obtaining a handover request from a UE, a second network determines whether the UE is involved in an on-going call. If a call is on-going, the second network hands over the call from the first network to the second network. The UE continues the call in the second network. If a call is not on-going (e.g., the UE is during a call attempt), the UE maintains the connection with the first network. After a connection between the UE and a calling terminal or a called terminal is established (i.e., the call is on-going), the second network hands over the call from the first network to the second network. The UE then continues the call in the second network.

Figure 2:
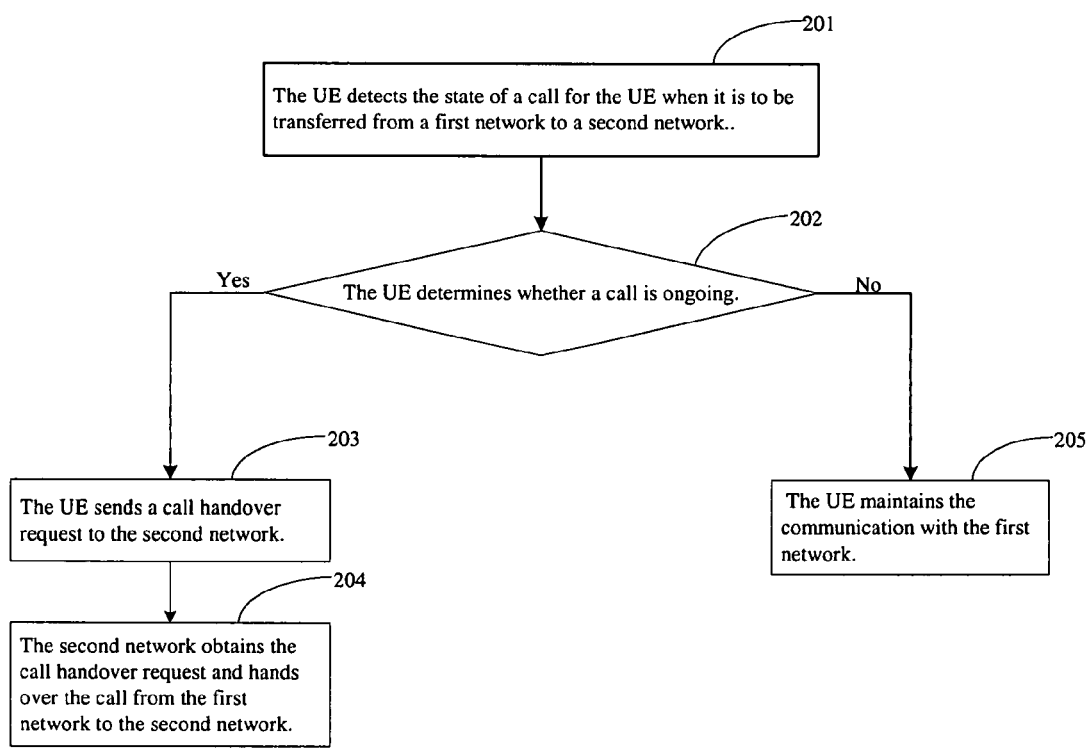
FIG. 2 shows an embodiment of a method for controlling handover performed by a UE.

FIG. 2 shows an embodiment of a method for controlling handover performed by the UE when the UE is to be transferred from the first network to the second network. For example, the first network may be a CS domain, and the second network may be an IMS domain. Also, the first network may be an IMS domain, and the second network may be a CS domain.

In block 201, the UE detects the state of a call for the UE when it is to be transferred from a first network to a second network.

In block 202, the UE determines whether a call is on-going.

In block 203, in response to determining that a call is on-going (i.e., the UE is not during a call attempt), the UE sends a call handover request to the second network.

In block 204, the second network obtains the call handover request and hands over the call from the first network to the second network. The UE continues the call in the second network. In this embodiment, the second network does not determine whether the call is on-going.

In block 205, in response to determining that the call is not on-going (i.e., the UE is during a call attempt), the UE maintains the communication with the first network. After the call is on-going (i.e., a connection between the UE and a calling terminal or a called terminal is established), the second network hands over the call from the first network to the second network. The UE then continues the call in the second network.

In an embodiment, the signaling traffic in an IMS domain uses SIP. Whenever the UE is calling or being called in an IMS domain, the state of the call (on-going, call attempt, or standby) can be obtained from the SIP signaling. If the call is on-going when the UE is to be transferred from the IMS domain to the CS domain, the call is handed over from the IMS domain to the CS domain according to VCC. If the UE is during a call attempt when the UE is to be transferred from the IMS domain to the CS domain, the UE maintains the connection with the IMS domain. When the call is on-going, the UE initiates the handover from the IMS domain to the CS domain. After the handover, the UE continues the call in the CS domain. The call is handed over smoothly from the IMS domain to the CS domain when the UE is to be transferred from the IMS domain to the CS domain, providing continuity of the voice call.

The UE is made aware of its call state when being called in a CS domain. The called UE determines whether the call is on-going or whether the called UE is during the period of ringing, when the called UE is to be transferred from the CS domain to the IMS domain. If the call is on-going or the called UE is not during the period of ringing, the called UE initiates the VCC handover from the CS domain to the IMS domain. If the call is not on-going (the called UE is during the period of ringing), the called UE maintains the connection with the CS domain.

A calling UE is made aware of the call state by a CONNECT message in the CS domain of the GSM or UMTS. In GSM or UMTS, a Mobile Switching Center (MSC) communicating with the calling UE sends a CONNECT message to the calling UE after the called user picks up the phone to indicate that the call is received by the called user.

Figure 3:
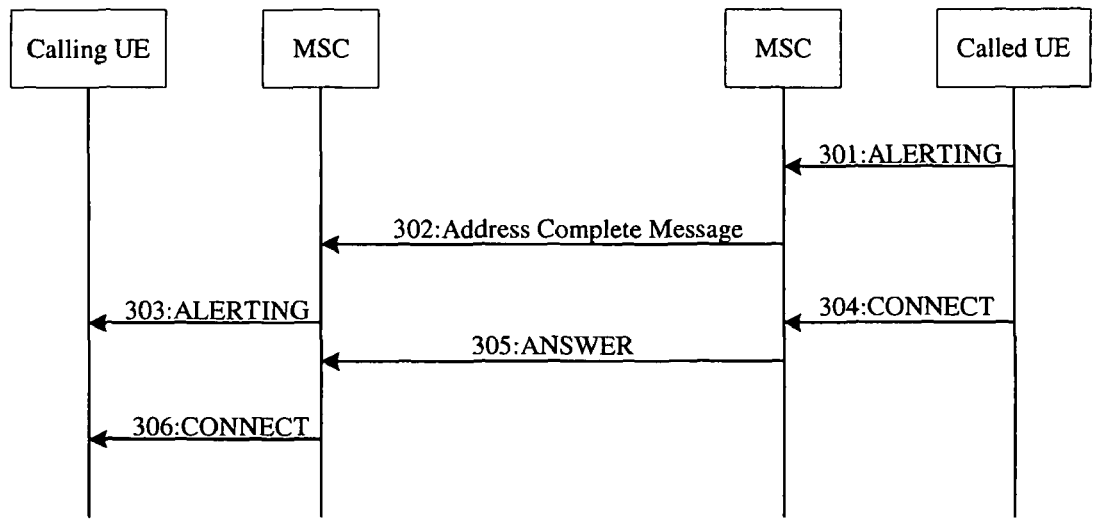
FIG. 3 provides a message flow diagram for call establishment in GSM or UMTS in accordance with an embodiment of the present invention.

FIG. 3 provides a message flow diagram for call establishment in GSM or UMTS. The detailed flow is as follow:

301: The called UE sends an ALERTING message to the MSC communicating with it.

302: The MSC communicating with the called UE sends an Address Complete Message (ACM) to the MSC communicating with the calling UE to indicate that the called UE is ringing (i.e., the calling UE is during a call attempt).

303: The MSC communicating with the calling UE sends the ALERTING message to the calling UE to indicate that the called UE is ringing.

304: Once the call is received, the called UE sends a CONNECT message to the MSC communicating with it.

305: The MSC communicating with the called UE sends an ANSWER message to the MSC communicating with the calling UE to indicate that the call is on-going (i.e., the connection between the calling UE and the called UE is established).

306: The MSC communicating with the calling UE sends the CONNECT message to the calling UE to indicate that the call is on-going.

The calling UE determines whether to hand over when the calling UE is to be transferred from the CS domain of the GMS or UMTS to the IMS domain according to the messages as the indications of the call states described in above-mentioned flow.

The calling UE can not obtain the information of the call state in a Code Division Multiple Access (CDMA) network because the MSC communicating with the calling UE does not send the call state information to the calling UE. In one embodiment of the present invention, the calling UE can obtain the call state information by an expanded Flash with information (FWI) message.

Figure 4:
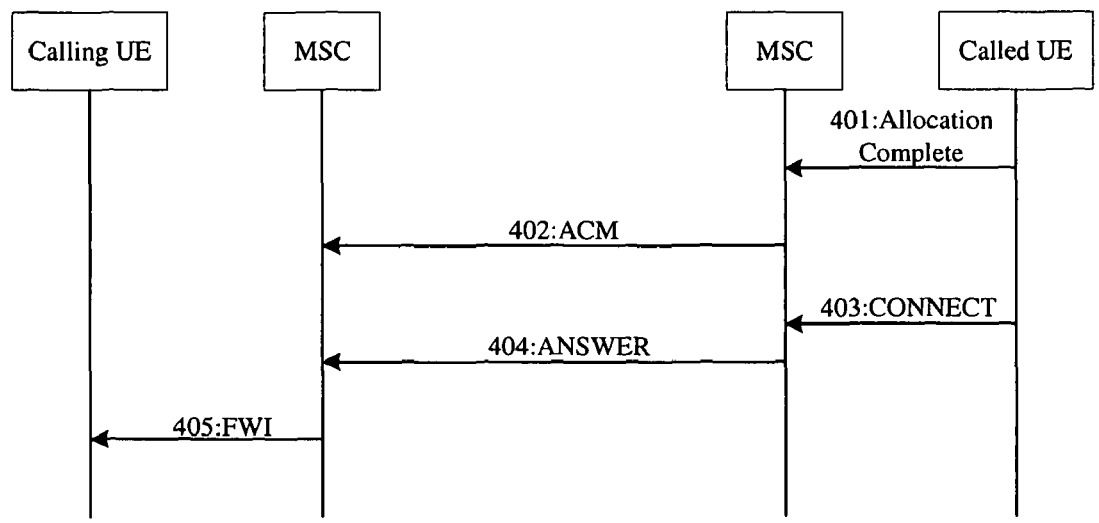
FIG. 4 provides a message flow diagram for call establishment in CDMA in accordance with an embodiment of the present invention.

FIG. 4 provides a message flow diagram for call establishment in CDMA. The detailed flow is as follow:

401: The called UE sends an Allocation Complete message to the MSC communicating with it.

402: The MSC in communication with the called UE sends an ACM to the MSC in communication with the calling UE to indicate that the called UE is ringing (i.e., the calling UE is during the period of ring-back tone).

403: Once the call has been received, the called UE sends a CONNECT message to the MSC communicating with it.

404: The MSC communicating with the called UE sends an ANSWER message to the MSC communicating with the calling UE to indicate that the call is on-going (i.e., the connection between the calling UE and the called UE has been established).

405: The MSC communicating with the calling UE sends the expanded FWI message with the information of the call state to the calling UE to indicate that the call is on-going (i.e., the call is answered).

The calling UE determines whether to hand over when the UE is to be transferred from the CS domain of the CDMA to the IMS domain according to the messages as the indications of the call states described in above-mentioned flow.

The VCC AS that serves as an anchor point for a voice call is aware of the call state. In one embodiment, a calling UE is to be transferred from a CS domain to an IMS domain. The VCC AS detects the call state after obtaining a handover request from the calling UE. If the call state is a call attempt, the VCC AS returns a reject message to the calling UE to reject the handover request, or it returns a Pending message to the calling UE to indicate that the handover request is waiting to be processed. In one embodiment, a Try-After header is inserted in the reject message to indicate that the calling UE can try again after a certain amount of time, such as 10 seconds. In alternative, the calling UE can try again after a certain amount of time voluntarily without the indication of a Try-After header.

In an alternative embodiment, the VCC AS sends the call state information to the calling UE. The VCC AS sends an Answer message to the calling UE to inform the calling UE that the call has entered a "call received" state (i.e., the call is now on-going) after informed by the called UE that the called UE has received the call. The calling UE may send a SUBSCRIBE message to the VCC AS to subscribe for the Answer message. The Answer information may be inserted in a message, which the VCC AS sends to the UE. The calling UE will not initiate the handover until receiving the Answer message from the VCC AS. The calling UE determines whether to hand over according to the information from the VCC AS. In this embodiment, the VCC AS will not determine whether the call is on-going after receiving the handover request from the calling UE. The Answer information may be sent via a Short Message Service (SMS).

Figure 5:
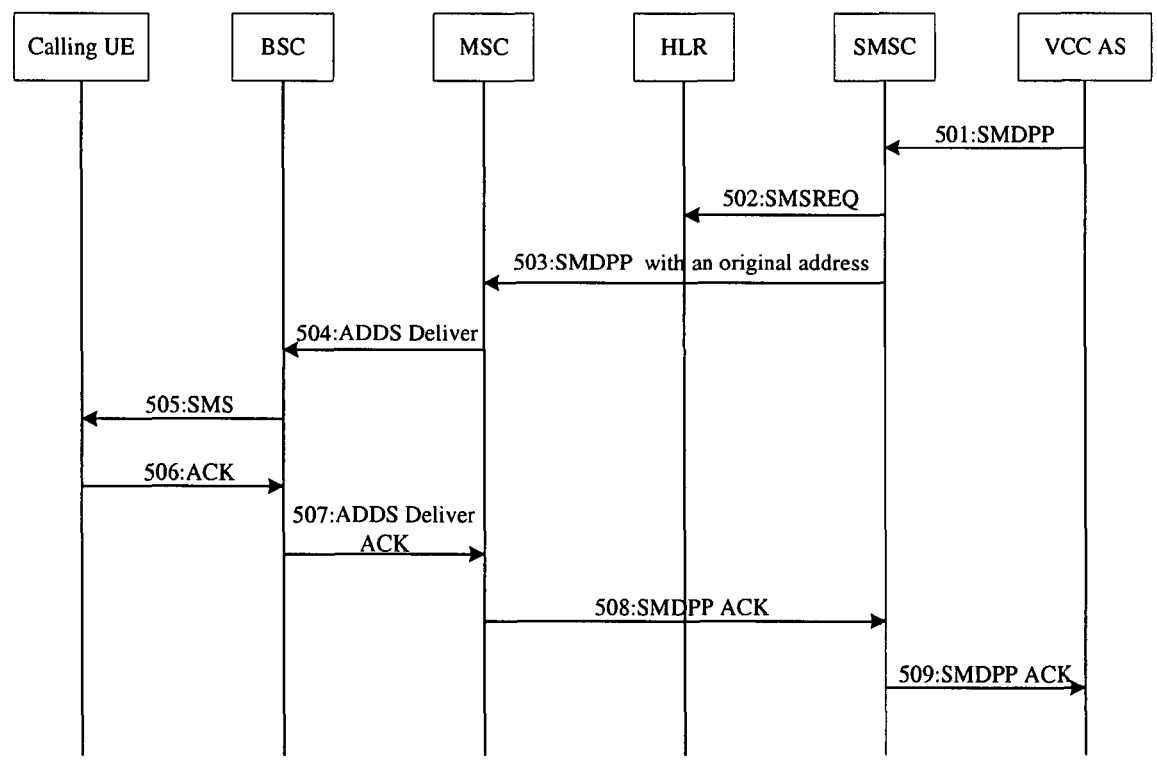
FIG. 5 provides a message flow diagram for sending an Answer message via an SMS message in accordance with an embodiment of the present invention.

FIG. 5 provides a message flow diagram for sending the Answer information via a SMS message. The detailed flow is as follow:

501: The VCC AS sends a Short Message service Delivery Point to Point (SMDPP) message to a Short Message Service Center (SMSC) to ask for a SMS message to the calling UE to indicate that the call has been received by the called UE.

502: The SMSC sends an SMS Request (SMSREQ) message to a Home Location Register (HLR) for obtaining the information of a MSC communicating with the UE.

503: The SMSC sends the SMDPP message with an original address to the MSC communicating with the calling UE to transmit the SMS message.

504: The MSC sends an Application Data Delivery Service (ADDS) Deliver message to a Base Station Controller (BSC) communicating with the calling UE to transmit the SMS message.

505: The BSC sends the SMS message to the calling UE. The information of the call state is included in the SMS text.

506: The calling UE sends an Acknowledge (ACK) message to the BSC.

507: The BSC sends an ADDS Deliver ACK message to the MSC.

508: The MSC sends a SMDPPACK message to the SMSC.

509: The SMSC sends a SMDPP ACK message to the VCC AS to indicate that the SMS message has been sent to the calling UE.

In this embodiment, the calling UE obtains the call state via the SMS message, and determines whether to initiate the handover according to the SMS when the calling UE is to be transferred from the CS domain to the IMS domain. If the calling UE obtains the Answer information from the VCC AS, the calling UE will initiate the handover and send a handover request to the VCC AS. The VCC AS hands over the call from the CS domain to the IMS domain directly when receiving the handover request.

It should be emphasized that the above-described embodiments, particularly, any 'preferred' embodiments, are merely possible examples of implementations, merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

What is claimed is:

1. A method for controlling a call handover between telecommunication networks, comprising:

Obtaining a handover request by a second network;

determining whether a User Equipment (UE), in communication with a first network, is engaged in a call attempt when the UE is to be transferred from the first network to the second network;

if the UE is engaged in the call attempt, maintaining a communication between the UE and the first network by saving the handover request and returning a Pending message to the UE; and if the UE is not engaged in the call attempt, processing the saved handover request and initiating a handover of the UE from the first network to the second network.

2. The method of claim 1, wherein whether the UE is engaged in the call attempt is communicated via a Session Initiation Protocol (SIP) signaling.

3. The method of claim 1, wherein whether the UE is engaged in the call attempt is communicated via a message having call state information therein.

4. The method of claim 1, wherein the first network is a Circuit Switched (CS) domain, and the second network is an IP multimedia subsystem (IMS) domain.

5. The method of claim 1, wherein the first network is an IP multimedia subsystem (IMS) domain, and the second network is a Circuit Switched (CS) domain.

6. The method of claim 1, wherein the determining whether the UE is engaged in the call attempt is performed by the UE.

7. The method of claim 1, wherein the determining whether the UE is engaged in the call attempt is performed by a voice call continuity application server (VCCAS).

8. The method of claim 1, further comprising:
obtaining a handover request by the second network; and
if the UE is engaged in the call attempt, rejecting the handover request.

9. The method of claim 1, wherein the Pending message is used to indicate that the handover request is waiting to be processed.

10. The method of claim 1, wherein the call attempt is a period of call negotiation, ringing, or ring-back tone.

11. A method for controlling a call handover between telecommunication networks, comprising:
Obtaining a handover request by a second network;
determining whether a call is on-going when a UE, in communication with a first network, is to be transferred from the first network to the second network;
if the call is not on-going, maintaining a communication between the UE and the first network by saving the handover request and returning a Pending message to the UE; and if the call is on-going, processing the saved handover request and initiating a handover of the UE from the first network to the second network.

12. The method of claim 11, wherein whether the call is on-going is communicated via a Session Initiation Protocol (SIP) signaling.

13. The method of claim 11, wherein whether the call is on-going is communicated via a message having call state information therein.

14. The method of claim 11, wherein the first network is a CS domain, and the second network is an IP multimedia subsystem (IMS) domain.

15. The method of claim 11, wherein the first network is an IMS domain, and the second network is a Circuit Switched (CS) domain.

16. The method of claim 11, wherein the determining whether the call is on-going is performed by the UE.

17. The method of claim 11, wherein the determining whether the call is on-going is performed by a voice call continuity application server (VCCAS).

18. The method of claim 11, further comprising:
obtaining a handover request by the second network;
if the call is not on-going, rejecting the handover request.

19. The method of claim 11, wherein the Pending message is used to indicate that the handover request is waiting to be processed.

20. A voice call continuity application server (VCCAS) system for controlling a call handover between telecommunication networks, the VCCAS comprising:
a processor configured to:
Obtain a handover request from a User Equipment (UE);
determine whether the User Equipment (UE), in communication with a first network, is engaged in a call attempt when the UE is to be transferred from the first network to a second network;
if the UE is engaged in the call attempt, maintaining a communication between the UE and the first network by saving the handover request and returning a Pending message to the UE; and
if the UE is not engaged in the call attempt, process the saved handover request and initiate a handover of the UE from the first network to the second network.

* * * * *